United States Patent
Zhang et al.

(10) Patent No.: US 11,422,448 B2
(45) Date of Patent: Aug. 23, 2022

(54) HIGH EFFICIENCY AND UNIFORMITY WHITE LIGHT GENERATOR STIMULATED BY LASER

(71) Applicant: MATERION PRECISION OPTICS (SHANGHAI) LIMITED, Pudong Shanghai (CN)

(72) Inventors: Wen Bo Zhang, Shanghai (CN); Ying Xu, Shanghai (CN)

(73) Assignee: Materion Precision Optics (Shanghai) Limited, Shanghai (CN)

( * ) Notice: Subject to any disclaimer, the term of this patent is extended or adjusted under 35 U.S.C. 154(b) by 0 days.

(21) Appl. No.: 16/979,207

(22) PCT Filed: Apr. 28, 2018

(86) PCT No.: PCT/CN2018/085058
§ 371 (c)(1),
(2) Date: Sep. 9, 2020

(87) PCT Pub. No.: WO2019/205126
PCT Pub. Date: Oct. 31, 2019

(65) Prior Publication Data
US 2020/0409250 A1    Dec. 31, 2020

(51) Int. Cl.
*G03B 21/20* (2006.01)
*G02B 26/00* (2006.01)
*F21V 9/32* (2018.01)

(52) U.S. Cl.
CPC ............ *G03B 21/204* (2013.01); *F21V 9/32* (2018.02); *G02B 26/008* (2013.01)

(58) Field of Classification Search
CPC ........ G03B 21/204; G02B 26/008; F21V 9/32
See application file for complete search history.

(56) References Cited

U.S. PATENT DOCUMENTS

2012/0087103 A1* 4/2012 Dai .......................... F21V 5/10
362/355
2013/0194551 A1* 8/2013 Zhang .................. G03B 21/204
353/31
(Continued)

FOREIGN PATENT DOCUMENTS

CN     102563410 A    7/2012
CN     104345535 A    2/2015
(Continued)

OTHER PUBLICATIONS

M. Janecek, "Reflectivity Spectra for Commonly Used Reflectors," in IEEE Transactions on Nuclear Science, vol. 59, No. 3, pp. 490-497, Jun. 2012, doi: 10.1109/TNS.2012.2183385. (Year: 2012).*
(Continued)

*Primary Examiner* — Rajarshi Chakraborty
*Assistant Examiner* — Nathaniel J Lee
(74) *Attorney, Agent, or Firm* — Tucker Ellis LLP

(57) ABSTRACT

A white light source comprises a luminescent layer comprising a phosphor and light scattering material disposed in a binder, and a light source arranged to illuminate the luminescent layer with blue light. The white light source outputs white light comprising converted phosphor emission light from the phosphor illuminated by the blue light and unconverted scattered blue light that is scattered by the light scattering material. The unconverted scattered blue light has a spatial distribution matching a spatial distribution of the converted phosphor emission light. In some embodiments the spatial distributions are approximately Lambertian spatial distributions. The white light source may comprise a phosphor wheel including a disk-shaped substrate on which the luminescent layer is disposed as a phosphor ring. The phosphor ring may comprise the phosphor and light scat-
(Continued)

tering material disposed in the binder with uniform composition around the annulus of the phosphor ring.

32 Claims, 7 Drawing Sheets

(56) References Cited

U.S. PATENT DOCUMENTS

2016/0320003 A1 11/2016 Yuan et al.
2017/0227192 A1 8/2017 Ikeda et al.

FOREIGN PATENT DOCUMENTS

| CN | 105549313 A | 5/2016 |
| CN | 207232511 U | 4/2018 |
| EP | 3643960 A1 | 4/2020 |
| JP | 2014535167 | 12/2014 |
| WO | 2016173527 A1 | 11/2016 |
| WO | 2017169187 | 10/2017 |

OTHER PUBLICATIONS

International Search Report from corresponding International Application No. PCT/CN2018/085058 dated Jan. 30, 2019.
International Preliminary Report on Patentability from corresponding International Application No. PCT/CN2018/085058 dated Nov. 12, 2020.
Extended European Search Report from corresponding European Application No. 18916033, dated Apr. 19, 2021, 7 pages.

* cited by examiner

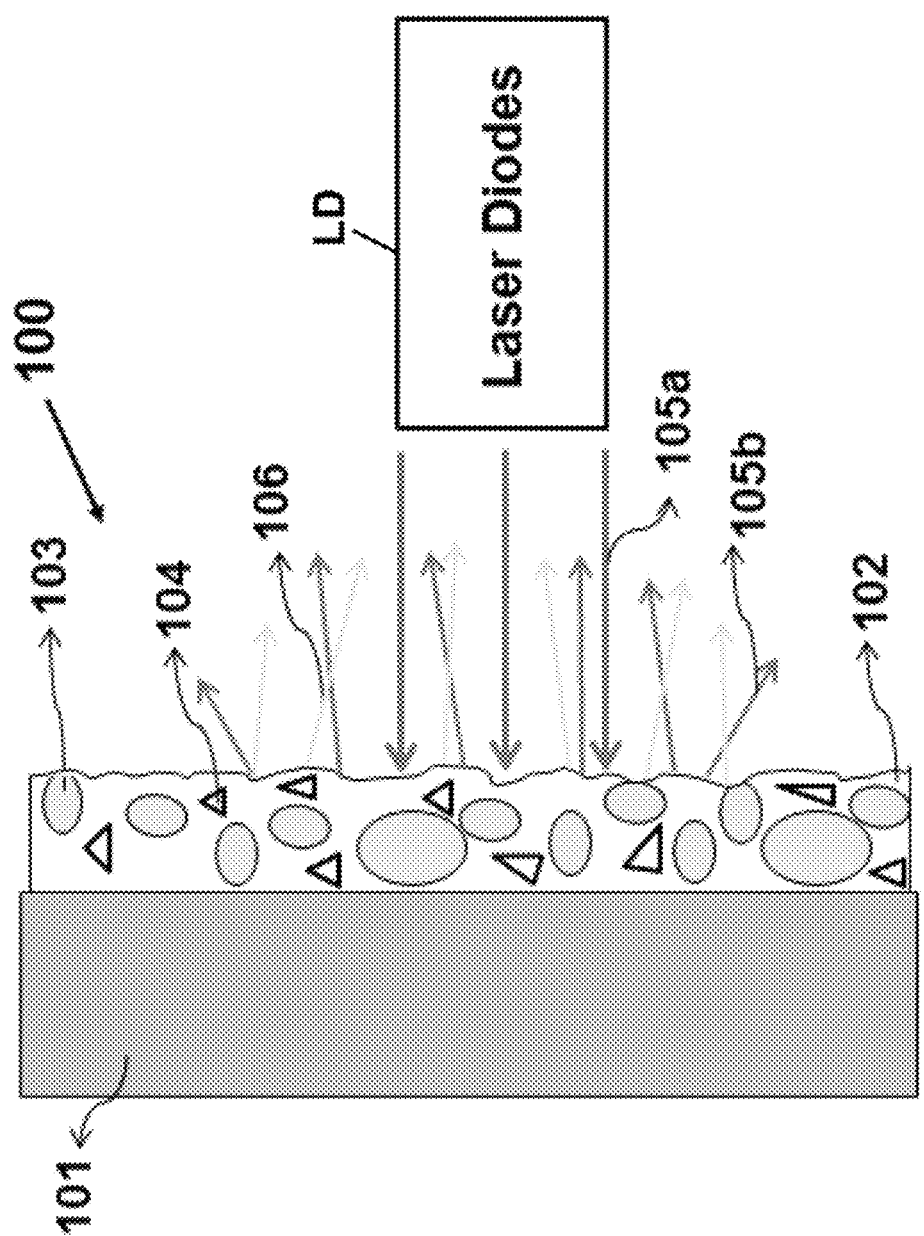

HIGH EFFICIENCY AND UNIFORMITY WHITE LIGHT GENERATOR STIMULATED BY LASER

BACKGROUND

The following relates to the illumination arts, phosphor wheel arts, optical interference filter manufacturing arts, and related arts.

Production of white light using phosphors with different colours stimulated by a blue LED or laser diode is known.

For most Digital Light Projection (DLP) projectors, a phosphor wheel operates as a second light source and is stimulated by a blue laser diode to produce green, yellow, and red light in a rapid time sequence as the phosphor wheel rotates. These various color lighting combine with blue light to yield white light for the DLP projection system. Most phosphor wheels are of a reflection type, with several color segments. To combine these different color lights, corresponding light paths and color-mixing hardware is provided.

Some improvements are disclosed herein.

BRIEF SUMMARY

In one disclosed aspect, a phosphor wheel comprises a disk-shaped substrate and a phosphor ring comprising an annular luminescent layer disposed on the disk-shaped substrate. The annular luminescent layer comprises a phosphor and light scattering material disposed in a binder. The light scattering material in some embodiments comprises light scattering particles disposed in the binder. The light scattering particles in some embodiments have size in a range of 0.1-50 microns. The light scattering particles in some embodiments have reflectivity of 92% or higher. The light scattering particles in some embodiments comprise one or more of aluminium oxide particles, titania particles, magnesium oxide particles, borazon particles, aluminium nitride particles, or aluminate particles. In some embodiments the annular luminescent layer comprises the phosphor and light scattering material disposed in the binder with uniform composition around the annulus of the annular luminescent layer. The phosphor wheel in some embodiments further includes a motor operatively connected to rotate the disk-shaped substrate. These various embodiments may be variously combined.

In another disclosed aspect, a white light source comprises a phosphor wheel as set forth in the immediately preceding paragraph, and a blue light source arranged to illuminate the phosphor ring with blue light. The white light source outputs white light comprising converted phosphor emission light from the phosphor illuminated by the blue light and unconverted scattered blue light that is scattered by the light scattering material. In some embodiments the unconverted scattered blue light has a spatial distribution matching a spatial distribution of the converted phosphor emission light. In some embodiments the unconverted scattered blue light has a diffuse reflecting surface spatial distribution and the converted phosphor emission light has a diffuse reflecting surface spatial distribution. In some embodiments blue light has a wavelength range of 400 nm to 500 nm. In some embodiments the converted phosphor emission light comprises yellow light. In some embodiments the phosphor comprises a mixture of red phosphor producing converted phosphor emission light in a red spectral range of 600-650 nm green phosphor producing converted phosphor emission light in a green spectral range of 490-560 nm. In some embodiments the phosphor wheel is a reflective phosphor wheel. In some embodiments the phosphor wheel is a transmission phosphor wheel. These various embodiments may be variously combined.

In another disclosed aspect, a white light source comprises a luminescent layer comprising a phosphor and light scattering material disposed in a binder, and a light source arranged to illuminate the luminescent layer with blue light. The white light source outputs white light comprising converted phosphor emission light from the phosphor illuminated by the blue light and unconverted scattered blue light that is scattered by the light scattering material. In some embodiments the light scattering material comprises light scattering particles disposed in the binder. In some embodiments the light scattering particles have size in a range of 0.1-50 microns. In some embodiments the light scattering particles have reflectivity of 92% or higher for the blue light. In some embodiments the light scattering particles comprise one or more of aluminium oxide particles, titania particles, magnesium oxide particles, borazon particles, aluminium nitride particles, or aluminate particles. In some embodiments unconverted scattered blue light has a spatial distribution matching a spatial distribution of the converted phosphor emission light. In some embodiments the unconverted scattered blue light has a diffuse reflecting surface spatial distribution and the converted phosphor emission light has a diffuse reflecting surface spatial distribution. In some embodiments the blue light has a wavelength range of 400 nm to 500 nm. In some embodiments the converted phosphor emission light comprises yellow light. In some embodiments the phosphor comprises a mixture of red phosphor producing converted phosphor emission light in a red spectral range of 600-650 nm green phosphor producing converted phosphor emission light in a green spectral range of 490-560 nm. These various embodiments may be variously combined.

In another disclosed aspect, a white light generation method is disclosed. A portion of blue light is converted to phosphor light by a phosphor disposed in a luminescent layer. A portion of the blue light that is not converted to phosphor light is scattered by scattering particles disposed in the luminescent layer to generate scattered blue light. White light is output which comprises a combination of the phosphor light and the scattered blue light. In some embodiments the phosphor light has a diffuse reflecting surface spatial distribution and the scattered blue light has a diffuse reflecting surface spatial distribution. In some embodiments, a phosphor wheel is rotated simultaneously with the converting, scattering, and outputting, wherein the phosphor wheel comprises a disk-shaped substrate on which the luminescent layer is disposed as a phosphor ring. In some embodiments the phosphor wheel is a reflective phosphor wheel and the white light is output on a same side of the phosphor wheel as a side of the phosphor wheel at which the blue light impinges. In some embodiments the phosphor wheel is a transmission phosphor wheel and the white light is output on an opposite side of the phosphor wheel from a side of the phosphor wheel at which the blue light impinges. These various embodiments may be variously combined.

BRIEF DESCRIPTION OF THE DRAWINGS

FIG. 1 diagrammatically shows an illustrative white light source operative in reflection mode.

DETAILED DESCRIPTION

Figure 1A:
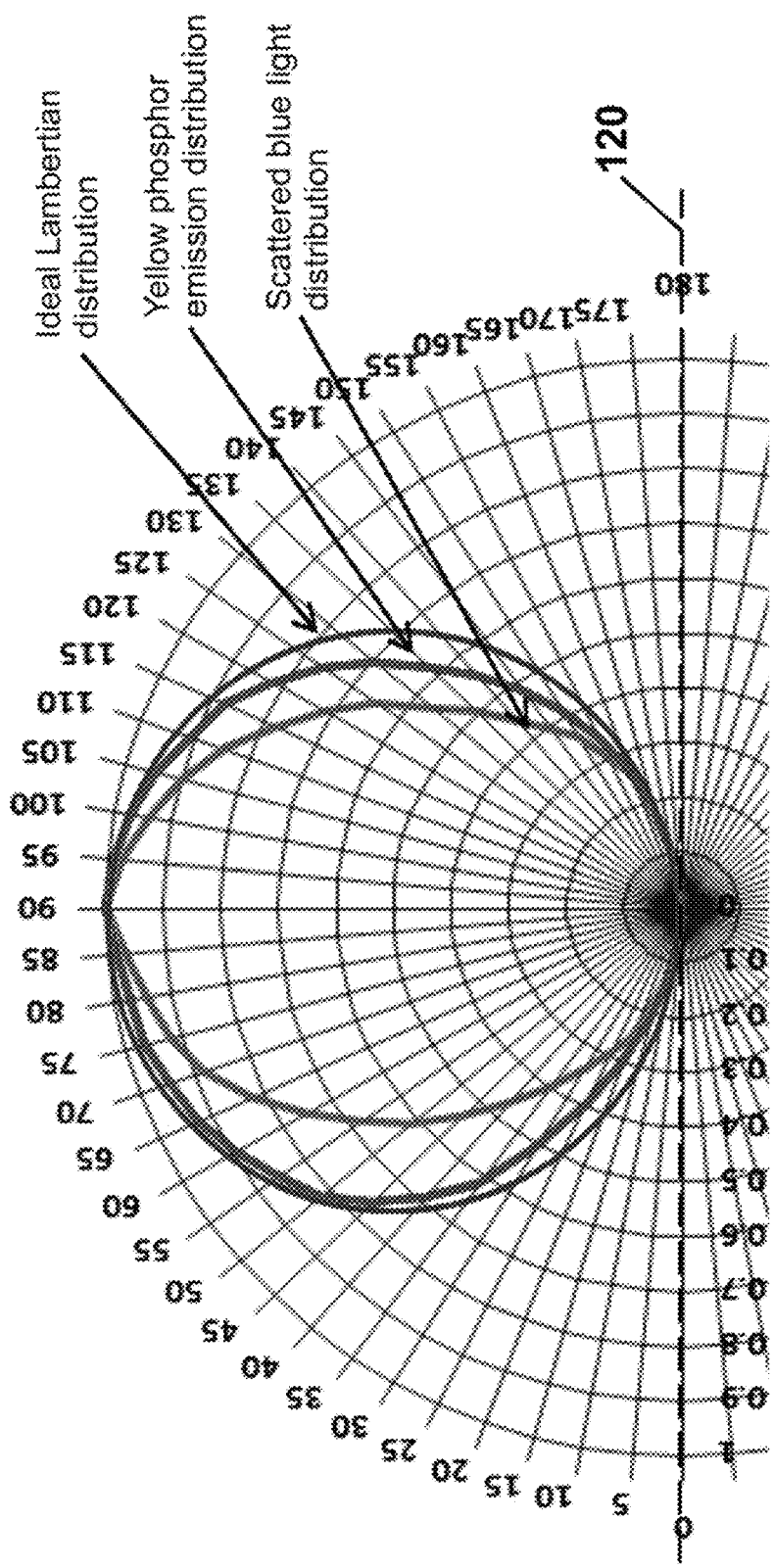
FIG. 1A plots various spatial distributions of light emitted from a surface as described herein.

Obtaining white light from the phosphor wheel directly would simply the projection system. In principle, different phosphors could be mixed together to produce white light with desired characteristics can provide more solutions for customers for DLP or LCD projectors.

However, effective production of white light by such an approach would be hindered by the very different spatial distributions of the phosphor emission, which is approximately Lambertian, and the direct blue laser light which is a narrow-angle beam.

Disclosed herein are embodiments in which white light is directly obtained using a phosphor wheel energized by a blue laser diode. To address the large spatial distribution mismatch, the phosphor (which typically includes yellow phosphor, though other phosphor compositions such as a mixture of green and red phosphors) is mixed with a light scattering material with high reflectivity for the blue light. In one suitable physical construction, the mixture of phosphor and light scattering material is dispersed in a binder, and the phosphor/scattering material/binder composition is deposited on a reflective substrate or a light-transmissive substrate by dispensing or silk printing or another suitable coating method.

The disclosed approaches provide numerous benefits, such as (but not limited to): adjustable color temperature (e.g., in a range of 4000-8000K depending on the spectral characteristics of the phosphor emission and the blue laser light); providing a spatial distribution of unexcited blue light that is close to the spatial distribution of the yellow light emitted by the phosphor, the white light source can be designed as either a transmission or reflection source; fabrication is straightforward; high white light output efficiency can be achieved; and good spatial uniformity of the white light output can be achieved.

The disclosed white light sources produce white light comprising a combination of direct blue light emitted by an LED or laser, and converted phosphor emission light (e.g. yellow light) to produce white light, further comprising light scattering material with high reflectivity added to improve uniformity of the direct blue light, that is, to adjust the spatial distribution of direct blue light to match the (approximately Lambertian) phosphor emission. The spatial distribution of blue light is typically close to Lambertian in shape after scatting of reflecting materials. The spatial distribution of the scattered direct blue light thus matches the approximately Lambertian spatial distribution of the converted yellow light emitted by the phosphor. The binder mixed with phosphor and light scattering material may be an organic binder or an inorganic binder.

The disclosed light source may be used in conjunction with either a reflection-type phosphor wheel or a transmission-type phosphor wheel. It is also contemplated to employ the disclosed light source in conjunction with other types of light emitters, such as one using a static phosphor layer that is not mounted on a rotating wheel. The disclosed light source is straightforward to prepare at low cost for either reflection-type or transmission-type designs. The disclosed approach is also amenable to providing white light with high brightness by way of using a high power laser diode or other high power blue light source. In this context, the use of a high power blue laser in conjunction with a rotating phosphor wheel with the disclosed phosphor/scattering particles dispersion has a substantial advantage in distributing heat generated by the laser over an annulus described by the path of the laser impingement on the rotating wheel.

The white light is generated by a combination of direct blue light and yellow phosphor-converted light. The blue light is unexcited (i.e. direct) blue light provided by a laser diode or LED, and the yellow light is converted light from the phosphor converting a portion of the blue light (i.e. excited blue light) to emission yellow light. In some embodiments, the wavelength range of blue light is in a range of 400 nm to 500 nm, and more preferably in a range of 400 to 480 nm. The lower bound of 400 nm is the shortest wavelength perceived as visual blue light by a typical person (shorter wavelengths being ultraviolet light not perceptible by typical persons). The upper limit of 480 nm is typically about the highest wavelength perceived as blue light by typical persons, while the upper limit of 500 nm is typically perceived as greenish-blue light by typical persons. However, it is contemplated to employ a laser or LED emitting direct light in the aforementioned 400-500 nm range, or more preferably 400-480 nm range, which also has some longer-wavelength content (e.g. green light and/or yellow light components) and/or some shorter-wavelength content (e.g. some ultraviolet component).

In some non-limiting illustrative embodiments, the yellow phosphor is stimulated by a blue laser, where the phosphor particle size is 1-50 microns (although larger or smaller phosphor particle size is also contemplated; moreover, all particle, grain, or similar sizes specified herein are to be understood as average or mean sizes), the illustrative yellow phosphor including cerium-substituted yttrium aluminum garnet (YAG:Ce), cerium-substituted terbium aluminum garnet (TAG:Ce), europium-substituted barium orthosilicate (BOS), or another suitable phosphor operative to convert the blue light to longer-wavelength visible light, e.g. yellow light. As disclosed herein, in order to improve uniformity of blue light, high scattering materials with high reflectivity are added to the mixture of phosphor and binder to scatter blue light to form a distribution that is close to the approximately Lambertian shape of the yellow light emission.

The scattering material preferably has a relatively high thermal conductivity, for example a thermal conductivity of 20 W/m·K or higher in some embodiments. The light scattering material preferably has a suitable thermal expansion coefficient (CTE) and density that is similar to the CTE and density of the phosphor to promote uniform mixing of the phosphor and light scattering material in the binder. The shape of the light scattering particles may be granular, spherical, flaky, fibrous, or so forth, and in some illustrative embodiments the light scattering particles are of size in a range of 0.1-50 microns, although larger or smaller particles are also contemplated. The light scattering particles are preferably highly reflective for the blue light (e.g. in a suitable range of 400-480 nm, or 400-500 nm), for example having reflectivity of 92% or higher in the 400 to 480 nm (or 500 nm) range in some embodiments. The light scattering particles are preferably stable over a typical operational temperature range, e.g. −20 to 500 centigrade degree in some embodiments. The upper operational temperature limit is dictated in part by the amount of heating of the phosphor/ scattering particles/binder layer induced by the laser—beneficially, this heating is reduced by operation of a rotating phosphor wheel which distributes the heat over an annular path of the laser beam across the rotating wheel. By way of non-limiting illustration, the light scattering material may for example comprise aluminium oxide particles, titania particles, magnesium oxide particles, borazon particles, aluminium nitride particles, aluminate particles, or some combination of two or more of these.

In a variant embodiment, an adhesive is used to bond phosphor powder mixed with the light scattering material described herein on a substrate. The adhesive may, for example, be an organic or inorganic glue. Some suitable inorganic adhesives include silicate, phosphate, borate, or so forth. Some suitable organic adhesive adhesives include silicone, epoxy, polyurethane, or so forth.

The substrate of the phosphor wheel or other white light source may, for example, comprise metal, metal alloy or a mixture of metal and inorganic materials, mirror, ceramic, glass, sapphire plate, quartz plate, or so forth. A reflective substrate (e.g. metal) is advantageous for a reflective design, and its reflectivity is preferably at least 85%, and more preferably at least 90% or higher, e.g. the reflective substrate may be designed on the surface of a metal, glass, ceramic or other suitable substrate; however, if the densities of phosphor and light scattering particles is high enough then substantially all blue light may be either converted to yellow light by the phosphor or scattered by the light scattering particles—in this case, it is contemplated for the substrate to be light-transmissive even in the case of a reflective design. On the other hand, a light-transmissive substrate such as glass or quartz is suitable for a light-transmissive phosphor wheel or other light-transmissive white light source. (As used herein, the term "light-transmissive" and similar phraseology is intended to denote high transmission, e.g. 80% or higher and preferably 90% higher, for the generated white light, i.e. over a spectral range of at least 400-650 nm or 400-700 nm depending upon the designed long-wavelength extent of the white light). In some illustrative embodiments, in the case of a phosphor wheel, substrate is disk-shaped; in the case of static phosphor module, the shape of the substrate may be a disk or rectangle or so forth. In some illustrative embodiments, the compositional weight ratio of the phosphor/scattering material/binder composition is 20% to 70% binder, 30% to 80% phosphor, and 5% to 15% scattering material. Higher or lower ratio components are also contemplated; for example, a thicker layer may allow for higher binder-to-phosphor and binder-to-scattering material ratios.

With reference now to FIG. 1, an illustrative white light source (100) operative in reflection mode is shown, and includes a substrate (101) on which is disposed a luminescent layer (102, 103, 104) including a binder (102), yellow phosphor (103), and light scattering material comprising light-scattering particles (104). The reflectivity of substrate (101) is preferably 90% or higher, in some illustrative embodiments has a thickness of between 0.3 mm to 3 mm, although a thicker or thinner substrate is also contemplated. It will be appreciated that the optimal substrate thickness depends on numerous factors—for example, in the case of a phosphor wheel the substrate (101) is a rotating wheel and should have sufficient thickness to be rigid during rotation, and this depends upon the rotation rate, stiffness of the material making up the substrate (101), and other factors.

In operation, one or more laser diodes (LD) emit excitation blue light (105a) that impinges on the luminescent layer (102, 103, 104). Alternatively, blue LEDs may be used to emit the blue light (105a). Other light sources emitting suitable blue light are also contemplated. Yellow light (106) is emitted by the yellow phosphor (103) in response to optical stimulation by the excitation blue laser light (105a). Only a portion of the incident blue light (105a) is converted to yellow light (106) by this phosphor conversion process; the remaining blue light is scattered by the scattering particles (104), and the scattered blue light (105b) combines with the yellow phosphor emission light (106) to form reflected white light (105b, 106).

With brief reference to FIG. 1A, the typical spatial distribution of the yellow phosphor emission light is a diffuse reflecting surface spatial distribution. An ideal diffuse reflecting surface spatial distribution is a Lambertian distribution as shown in FIG. 1A for a diagrammatic surface (120). A Lambertian spatial distribution has equal luminance when viewed from all directions lying in the half-space (122) adjacent to the surface (120). A physically realizable diffuse reflecting surface spatial distribution is usually only approximately Lambertian. FIG. 1A also illustrates a typical diffuse reflecting surface spatial distribution for the yellow phosphor, which is only approximately Lambertian. It should be noted that in the case of the phosphor emission light, the physical mechanism is not reflection, but rather absorption of blue light (105a) by the yellow phosphor (103) and consequent emission of the yellow converted phosphor light. (106). However, although produced by a different mechanism the phosphor emission (106) has a diffuse reflecting surface spatial distribution, which is an approximately Lambertian as shown in FIG. 1A. Likewise, the scattered blue light (105b) is produced by a somewhat different mechanism than reflection from a diffusing surface, since the light scattering particles (104) are distributed in depth over the thickness of the luminescent layer; nonetheless, the resulting spatial distribution is a diffuse reflecting surface spatial distribution, which is approximately Lambertian as shown in FIG. 1A.

To obtain the desired light distribution for the scattered blue light similar to the approximately Lambertian light distribution for the yellow light (106), it is preferable for the density of light scattering particles to be such that most or all of the direct blue light that is not converted to yellow light by the phosphor (103) to encounter and scatter from at least one light scattering particle (104). However, it is contemplated for some relatively small portion of the unconverted direct blue light to be reflected off the substrate (101) without interacting with either the phosphor (103) or the scattering particles (104).

In a typical conventional phosphor wheel used in a laser projector, the goal is for all incident blue light to be converted to yellow light. Any residual part of the incident blue light that is not converted is suitably removed by a dichroic filter downstream along the optical path of the projector system, so that only yellow light come from the luminescent layer. By contrast, in the white light source (100) of FIG. 1, in order to obtain the white light (105b, 106) a portion of the direct blue light is intentionally retained, which constitutes the unexcited blue light (105b) which has not stimulated the phosphor (103) to produce yellow light (106). The light scattering particles (104) ensure that this direct blue light (105b) has a spatial distribution that matches the approximately Lambertian spatial distribution of the converted yellow light (106), so that the thusly generated white light (105b, 106) is spectrally uniform over the approximately Lambertian distribution.

The white light (105b, 106) has a designed ratio of direct blue light (105b) and yellow light (106). This ratio is designed by adjusting the ratio of unexcited blue light and yellow light by adjusting the relative ratios of the phosphor (103), the scattering material (104), the binder (102), along with the thickness of the luminescent layer (102, 103, 104), and particle sizes of the phosphor (103) and scattering particles (104). Of these, the thickness of the luminescent layer (102, 103, 104) and the concentration of the phosphor (103) typically has the strongest effect on the ratio of blue light (105b) to yellow light (106) in the combined white light (105b, 106). The principle impact of the light scattering particles (104) on this ratio is due to absorption by the scattering particles (104), which is preferably low due to preferred high reflectivity (e.g. 90% or higher) of the scattering particles (104). Nonetheless, if a light ray typically reflects multiple times off the light scattering particles (104) then this absorption can be sufficiently high that it should be taken into account. Even in this case, however, if the reflection losses for blue and yellow light are similar (similar average number of reflections and similar reflectivity at the blue and yellow spectral regions) then the impact of the light scattering particles (104) on the blue/yellow ratio may be negligible.

Byway of non-limiting illustration, in some embodiments the luminescent layer (102, 103, 104) has a thickness of 0.05 mm to 0.3 mm, although a thicker or thinner luminescent layer is also contemplated based on optical design principles such as those outlined above, which depend on factors such as the relative ratios of the phosphor (103), scattering particles (104), and binder (102) and the particle sizes.

In the illustrative embodiment, the phosphor emission (106) is described as yellow light. However, it will be appreciated that the phosphor emission (106) can have a more complex spectrum, e.g. the phosphor (103) may comprise a mixture of red and green phosphors producing converted light with respective peaks in the red spectral range (~600-650 nm) and the green spectral range (~490-560 nm) respectively, and the converted light (106) with this "double-lobed" spectrum combined with the direct (unconverted) blue light (105b) is visually perceived as white light. The detailed spectrum of the direct blue light (105b) and the phosphor emission (106) may be tailored to provide white light with desired whiteness characteristics, such as a desired color rendering index (CRI), a desired color temperature (e.g. "cool" white light having a color temperature of around 4000K or higher).

Figure 2:
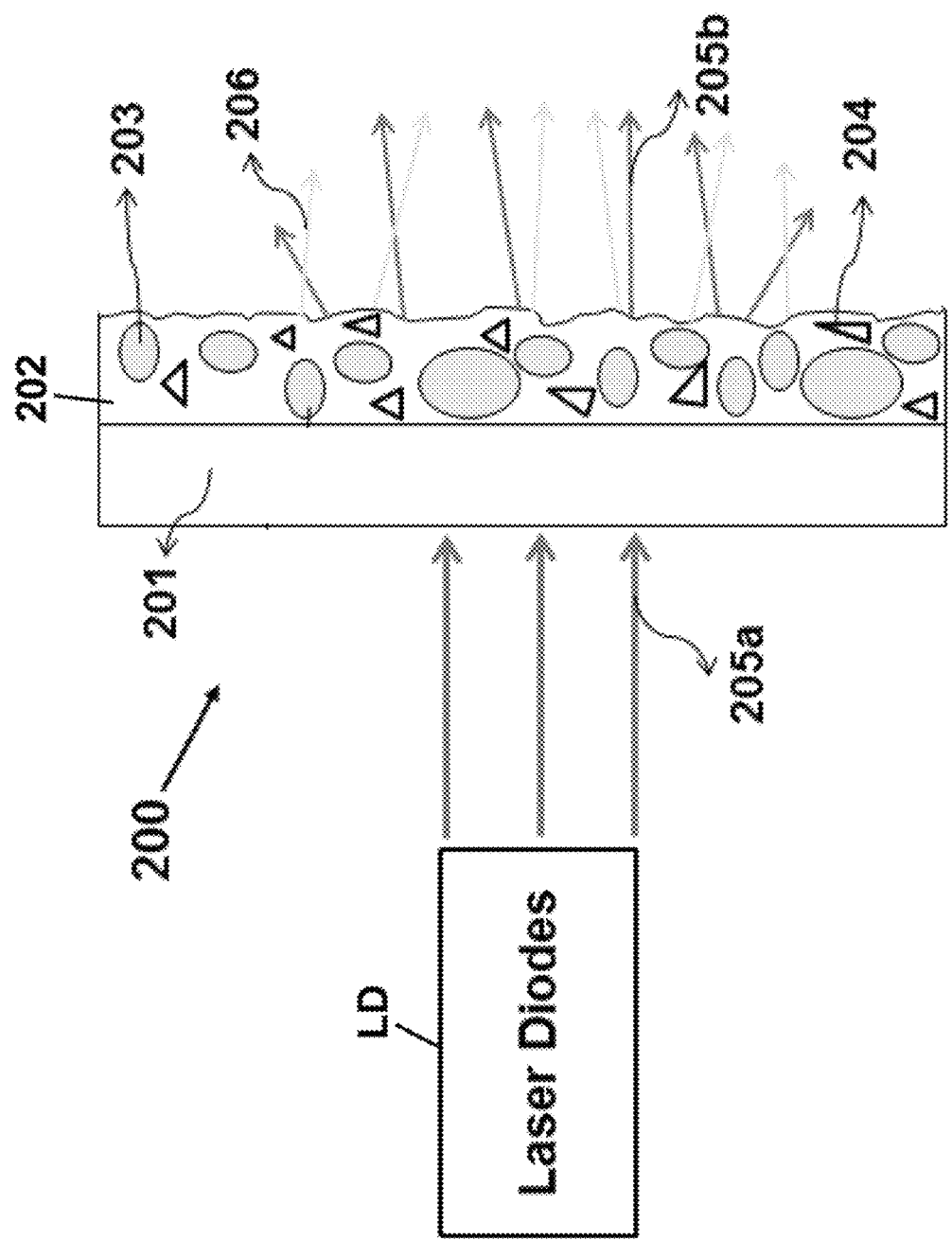
FIG. 2 diagrammatically shows an illustrative white light source operative in transmission mode.

With reference now to FIG. 2, an illustrative white light source (200) operative in transmission mode is shown, and includes a light-transmissive substrate (201) on which is disposed a luminescent layer (202, 203, 204) including a binder (202), yellow phosphor (203), and light scattering material comprising light-scattering particles (204). The light-transmissive substrate (2) in some illustrative embodiments has a thickness of between 0.1 mm to 3 mm, although a thicker or thinner substrate is also contemplated. The thickness of the luminescent layer (202, 203, 204) is in some embodiments 0.01 mm to 0.2 mm, although a thicker or thinner substrate is also contemplated. One or more laser diodes (LD) (or alternatively, one or more blue LEDs) illuminate the device from the substrate side that is, laser light (205a) impinges on the side of the substrate (201) opposite from the substrate side on which the luminescent layer (202, 203, 204) is disposed. As in the device of FIG. 1, a portion of the direct laser light (205a) is converted by the phosphor (203) to converted yellow light (206), while another portion of the blue light is passed through as unconverted blue light (205b) that combines with the yellow light (206) to form white light (205b, 206). To improve optical efficiency, in some embodiments the substrate (201) is coated with a dichroic film that passes the blue light (205a) but reflects the yellow light (206).

As in the embodiment of FIG. 1, the unconverted blue light (205b) is scattered by the scattering particles (204), and the scattered blue light (205b) combines with the yellow phosphor emission light (206) to form reflected white light (205b, 206). To obtain the desired diffuse reflecting surface light distribution for the scattered blue light (205b) similar to the approximately Lambertian light distribution for the yellow light (206), it is preferable for the density of light scattering particles (204) to be such that most or all of the direct blue light that is not converted to yellow light by the phosphor (203) to encounter and scatter from at least one light scattering particle (204). However, it is contemplated for some relatively small portion of the unconverted direct blue light to pass through the luminescent layer (202, 203, 204) without interacting with either the phosphor (203) or the light scattering particles (204). It is also again noted that the diffuse reflecting surface spatial distribution of the scattered blue light (205) is analogous to the diffuse reflection from a true diffusely reflecting surface, but is from a somewhat different mechanism as the scattering particles (204) are distributed over the thickness of the luminescent layer, and additionally the scattered light is produced by transmission rather than by a reflection process.

Figure 3:
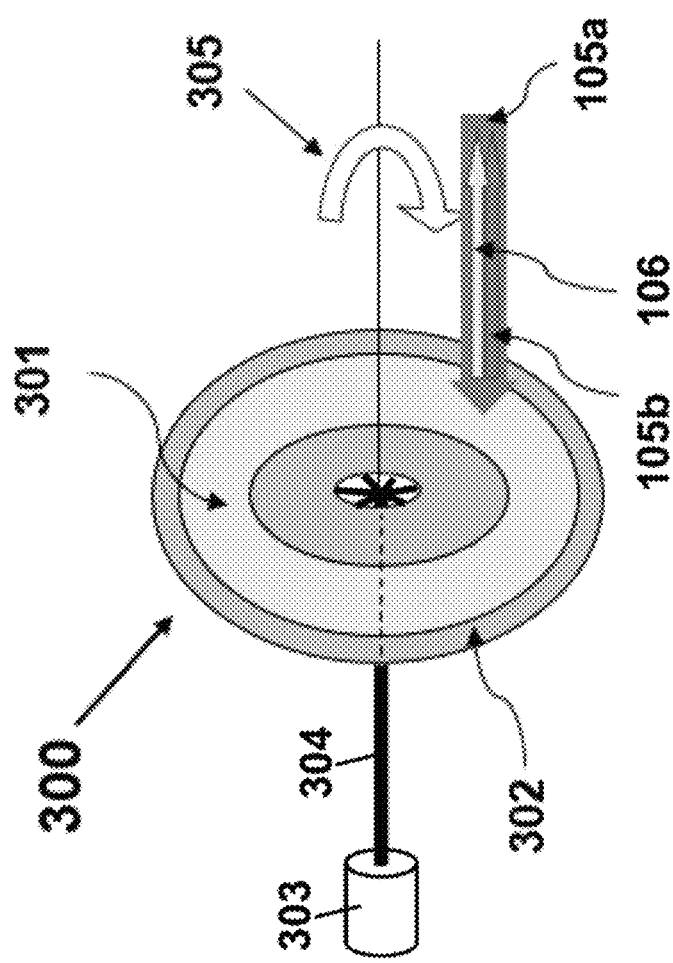
FIG. 3 diagrammatically shows a reflective phosphor wheel incorporating the white light source of FIG. 1.

FIG. 3 illustrates a phosphor wheel (300) which is configured to operate in reflective mode, using the reflective white light source (100) of FIG. 1. The YAG:Ce phosphor powders (103) and scattering materials (104) are mixed with binder (102), and then are dispersed on a metal substrate (302) (corresponding to the substrate (101) of FIG. 1) to prepare a phosphor ring (301) by dispensing or silk printing or other coating method. Said another way, the phosphor ring (301) is suitably formed as the luminescent layer (102, 103, 104) of FIG. 1 shaped as an annulus or ring. In some embodiments, depending upon the type of binder (102), the ring (301) may be suitably cured by heating to harden the binder. The phosphor wheel (300) is driven by a motor (303) and coupling driveshaft (304) in order to rotate in a clockwise direction indicated by the curved arrow (305) in FIG. 3 (counter-clockwise rotation is alternatively contemplated) to rotate with high speed. In addition to or alternative to the driveshaft (304), other operative couplings between the motor (303) and disk-shaped substrate (302) are contemplated to motorize rotation of the disk-shaped substrate (302), such as including gearing, right-angle mechanical linkages, and/or so forth. Excitation light (105a) is the incident light source. When the excitation laser beam, e.g., blue light (105) is focused on the phosphor ring (301) to form a light spot, the conversion yellow light beam (106) is emitted and combines with scattered blue light (105b) as previously described with reference to FIG. 1, and then will be collected by a lens system (not shown).

Figure 4:
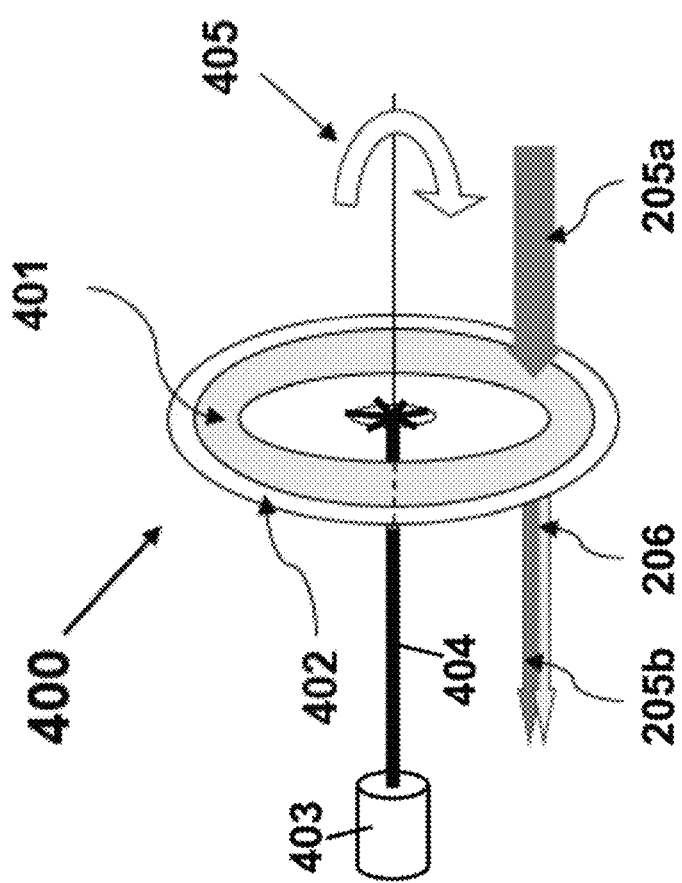
FIG. 4 diagrammatically shows a transmission phosphor wheel incorporating the white light source of FIG. 2.

FIG. 4 illustrates a phosphor wheel (400) which is configured to operate in transmission mode, using the light-transmissive white light source (200) of FIG. 2. The YAG:Ce phosphor powders (203) and scattering materials (204) are mixed with binder (202), and then are dispersed on a light-transmissive substrate (402) (corresponding to the substrate (201) of FIG. 2) to prepare a phosphor ring (401) by dispensing or silk printing or other coating method. Said another way, the phosphor ring (401) is suitably formed as the luminescent layer (202, 203, 204) of FIG. 2 shaped as an annulus or ring. The substrate (402) is transparent, such as glass, crystalline ceramics, sapphire plate, or so forth. In some embodiments, depending upon the type of binder (202), the ring (401) may be suitably cured by heating to harden the binder. The phosphor wheel (400) is driven by a motor (403) and coupling driveshaft (404) in order to rotate in a clockwise direction indicated by the curved arrow (405) in FIG. 4 (counter-clockwise rotation is alternatively contemplated) to rotate with high speed. In addition to or alternative to the driveshaft (404), other operative couplings between the motor (403) and disk-shaped substrate (402) are contemplated to motorize rotation of the disk-shaped substrate (402), such as including gearing, right-angle mechanical linkages, and/or so forth. Excitation light (205a) is the incident light source. When the excitation laser beam, e.g., blue light (205a) is focused on the phosphor ring (401) to form a light spot, the conversion yellow light beam (206) is emitted and combines with scattered blue light (205b) as previously described with reference to FIG. 2, and then will be collected by a lens system (not shown).

In the embodiments of FIGS. 3 and 4, the respective substrates (302, 402) are preferably disks, optionally with a central opening for coupling with a motor shaft. The disk-shaped substrate may be mechanically balanced using known techniques to ensure minimal friction, wobble, or other undesired movement or forces during high speed rotation. The phosphor ring (301, 401) is centered on the disk-shaped substrate (302, 402), that is, the phosphor ring (301, 401) is concentrically arranged on the disk-shaped substrate (302, 402), and typically positioned at a relatively large radius, that is, the outer edge of the phosphor ring (301, 401) is typically close to the outer edge of the disk-shaped substrate (302, 402). As noted previously, due to the rotation the light interaction with the respective phosphor rings (301, 401) will describe annular paths, thus distributing heating over the annular path. This enables use of a higher-power laser beam, and/or stronger focusing of that beam to a tighter beam spot, thus increasing optical power that can be generated.

In the illustrative phosphor wheels of FIGS. 3 and 4, the annular luminescent layer (301, 401) comprises the phosphor (103, 203) and light scattering material (104, 203) disposed in the binder (102, 202) with uniform composition around the annulus of the annular luminescent layer (301, 401). This ensures that the reflected white light (105b, 106) or transmitted white light (205b, 206) has uniform spectral composition and uniform whiteness characteristics over a full 360° rotation of the disk-shaped substrate (302, 402). This means that the reflected white light (105b, 106) or transmitted white light (205b, 206) is constant, rather than being time-varying. The rotation of the phosphor wheel driven by the motor (303, 403) is thus not intended to provide a time sequence of different colors as in some conventional phosphor wheels, but rather provides for heat distribution of the thermal energy injected by the light source (LD) around the annulus.

Figure 5:
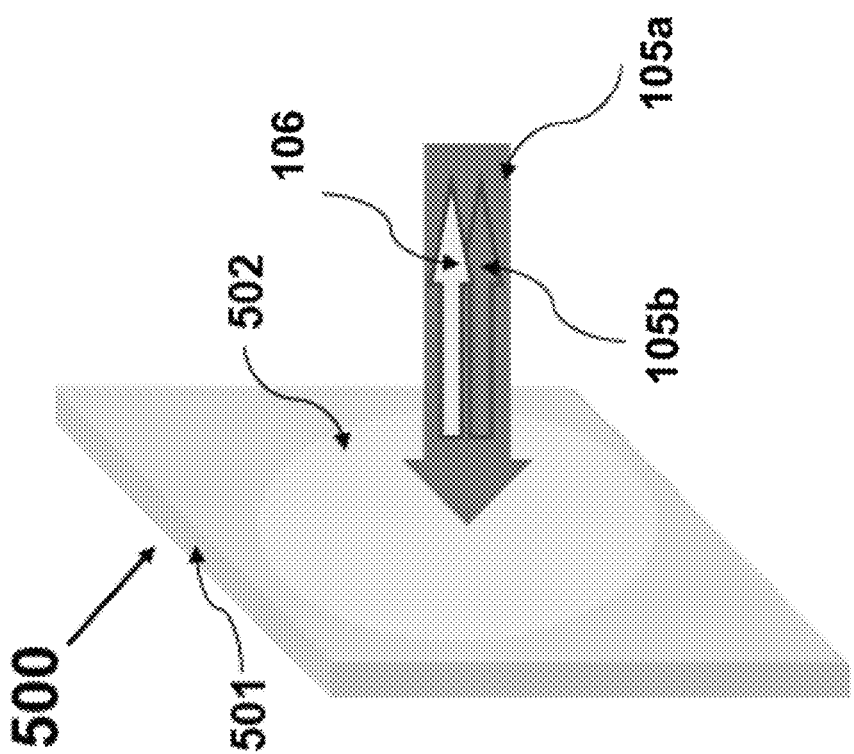
FIG. 5 diagrammatically shows a reflective static white light source incorporating the white light source of FIG. 1.
Figure 6:
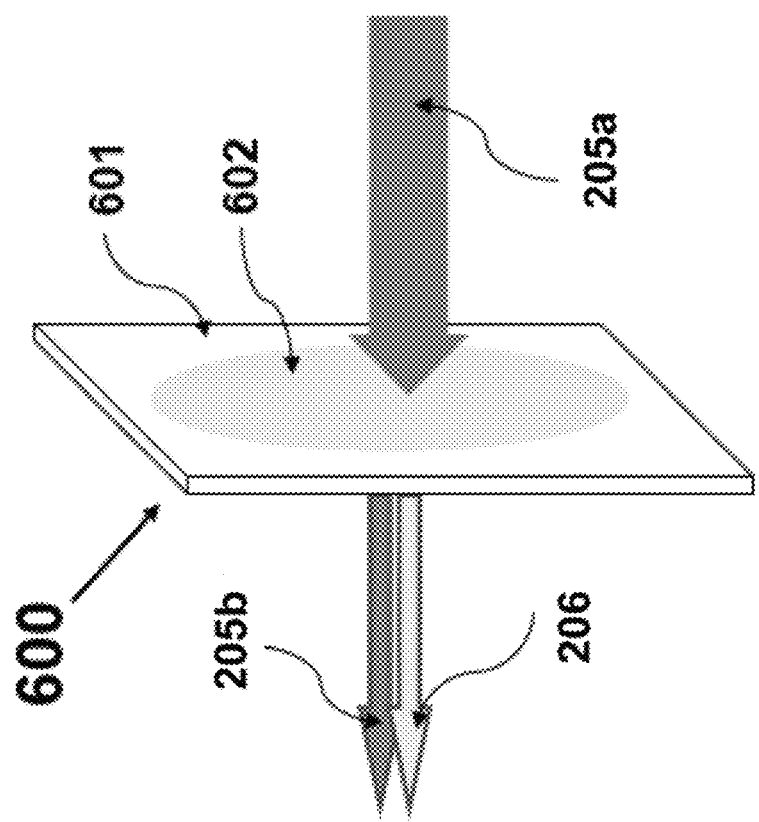
FIG. 6 diagrammatically shows a transmission static white light source incorporating the white light source of FIG. 2.

The disclosed reflective white light source (100) or transmissive white light source (200) of FIGS. 1 and 2, respectively, can alternatively be implemented as static white light sources, as illustrated in FIGS. 5 and 6. A static white light source is a white light source in which the luminescent layer is stationary respective to the light source that emits the blue light during operation of the white light source, that is, the luminescent layer does not rotate or otherwise move respective to the light source during operation of the white light source.

FIG. 5 shows a static white light source (500) having a reflective geometry, with a substrate (501) corresponding to the substrate (101) of FIG. 1, and a phosphor layer (502) disposed on the substrate (501) and corresponding to the luminescent layer (102, 103, 104) of FIG. 1 including the binder (102), yellow phosphor (103), and light scattering material comprising light-scattering particles (104). As described with reference to FIG. 1, excitation blue light (105a) is focused on the phosphor area (501) to form a light spot, the conversion yellow light beam (106) is emitted and combines with scattered blue light (105b) as previously described with reference to FIG. 1, and then will be collected by a lens system (not shown).

FIG. 6 shows a static white light source (600) having a light-transmissive geometry, with a substrate (601) corresponding to the substrate (201) of FIG. 2, and a phosphor layer (602) disposed on the substrate (601) and corresponding to the luminescent layer (202, 203, 204) of FIG. 2 including the binder (202), yellow phosphor (203), and light scattering material comprising light-scattering particles (204). As described with reference to FIG. 2, excitation blue light (205a) is focused on the phosphor area (601) to form a light spot, the conversion yellow light beam (206) is emitted and combines with scattered blue light (205b) as previously described with reference to FIG. 2, and then will be collected by a lens system (not shown).

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A phosphor wheel comprising:
   a disk-shaped substrate; and
   a phosphor ring comprising an annular luminescent layer disposed on the disk-shaped substrate, the annular luminescent layer comprising a composition of a phosphor and light scattering material disposed in a binder;
   wherein the composition is 20% to 70% binder, 30% to 80% phosphor, and 5% to 15% light scattering material such that generated white light is spectrally uniform over an approximately Lambertian distribution at a color temperature range of 5000K to 8000K.

2. The phosphor wheel of claim 1 wherein the light scattering material comprises light scattering particles disposed in the binder.

3. The phosphor wheel of claim 2 wherein the light scattering particles have at least one of a size in a range of 0.1-50 microns or a reflectivity of 92% or higher.

4. The phosphor wheel of claim 2 wherein the light scattering particles comprise one or more of aluminium oxide particles, titania particles, magnesium oxide particles, borazon particles, aluminium nitride particles, or aluminate particles.

5. The phosphor wheel of claim 2 wherein the annular luminescent layer comprises the phosphor and light scattering material disposed in the binder with uniform composition around the annulus of the annular luminescent layer.

6. The phosphor wheel of claim 1 wherein the light scattering material has at least one of a thermal conductivity of 20 W/m·K or higher or a coefficient of thermal expansion (CTE) and density that is substantially similar to the CTE and density of the phosphor.

7. The phosphor wheel of claim 1 further comprising:
   a motor operatively connected to rotate the disk-shaped substrate.

8. A white light source comprising:
   a phosphor wheel that includes:
      a disk-shaped substrate;

a phosphor ring comprising an annular luminescent layer disposed on the disk-shaped substrate;

wherein the annular luminescent layer comprises a composition of a phosphor and light scattering material disposed in a binder;

wherein the composition is 20% to 70% binder, 30% to 80% phosphor, and 5% to 15% light scattering material;

wherein the light scattering material comprises light scattering particles disposed in the binder; and a blue light source arranged to illuminate the phosphor ring with blue light having a wavelength range of 400 nm to 500 nm;

wherein the white light source outputs white light that is spectrally uniform over an approximately Lambertian distribution at a color temperature range of 5000K to 8000K, the white light comprising converted phosphor emission light from the phosphor illuminated by the blue light and unconverted scattered blue light that is scattered by the light scattering material.

9. The white light source of claim 8 wherein the unconverted scattered blue light has a spatial distribution matching a spatial distribution of the converted phosphor emission light.

10. The white light source of claim 8 wherein the unconverted scattered blue light has a diffuse reflecting surface spatial distribution and the converted phosphor emission light has a diffuse reflecting surface spatial distribution.

11. The white light source of claim 8 wherein the light scattering material has at least one of a thermal conductivity of 20 W/m·K or higher or a coefficient of thermal expansion (CTE) and density that is substantially similar to the CTE and density of the phosphor.

12. The white light source of claim 8 wherein the converted phosphor emission light comprises yellow light.

13. The white light source of claim 8 wherein the phosphor comprises a mixture of red phosphor producing converted phosphor emission light in a red spectral range of 600-650 nm green phosphor producing converted phosphor emission light in a green spectral range of 490-560 nm.

14. The white light source of claim 8 wherein the phosphor wheel is one of: a reflective phosphor wheel or a transmission phosphor wheel.

15. The white light source of claim 8 wherein the annular luminescent layer has a thickness between 0.01 mm and 0.3 mm such that the white light source outputs white light that is spectrally uniform over the approximately Lambertian distribution based at least upon the composition and thickness of the annular luminescent layer.

16. A white light source comprising:
a luminescent layer comprising a composition of a phosphor and light scattering material disposed in a binder wherein the composition is 20% to 70% binder, 30% to 80% phosphor, and 5% to 15% light scattering material; and
a light source arranged to illuminate the luminescent layer with blue light having a wavelength range of 400 nm to 500 nm;
wherein the white light source outputs white light that is spectrally uniform over an approximately Lambertian distribution at a color temperature range of 5000K to 8000K, the white light comprising converted phosphor emission light from the phosphor illuminated by the blue light and unconverted scattered blue light that is scattered by the light scattering material.

17. The white light source of claim 16 wherein the white light source is a static white light source in which the luminescent layer is stationary respective to the light source during operation of the white light source.

18. The white light source of claim 16 wherein the light scattering material comprises light scattering particles disposed in the binder.

19. The white light source of claim 18 wherein the light scattering particles have at least one of a size in a range of 0.1-50 microns or a reflectivity of 92% or higher for blue light.

20. The white light source of claim 18 wherein the light scattering particles comprise one or more of aluminium oxide particles, titania particles, magnesium oxide particles, borazon particles, aluminium nitride particles, or aluminate particles.

21. The white light source of claim 16 wherein the light scattering material has at least one of a thermal conductivity of 20 W/m·K or higher or a coefficient of thermal expansion (CTE) and density that is substantially similar to the CTE and density of the phosphor.

22. The white light source of claim 16 wherein the unconverted scattered blue light has a spatial distribution matching a spatial distribution of the converted phosphor emission light.

23. The white light source of claim 16 wherein the unconverted scattered blue light has a diffuse reflecting surface spatial distribution and the converted phosphor emission light has a diffuse reflecting surface spatial distribution.

24. The white light source of claim 16 wherein the luminescent layer has a thickness between 0.01 mm and 0.3 mm, wherein the composition and thickness of the luminescent layer are configured to obtain a spatial distribution of light that is an approximately Lambertian spatial distribution.

25. The white light source of claim 16 wherein the converted phosphor emission light comprises yellow light.

26. The white light source of claim 16 wherein the phosphor comprises a mixture of red phosphor producing converted phosphor emission light in a red spectral range of 600-650 nm green phosphor producing converted phosphor emission light in a green spectral range of 490-560 nm.

27. A white light generation method comprising:
by a phosphor in a composition disposed in a luminescent layer, converting a portion of blue light to phosphor light wherein the composition is 20% to 70% binder, 30% to 80% phosphor, and 5% to 15% light scattering material;
by scattering particles disposed in the luminescent layer, scattering a portion of the blue light that is not converted to phosphor light to generate scattered blue light; and
outputting white light that is spectrally uniform over an approximately Lambertian distribution at a color temperature range of 5000K to 8000K, the white light comprising a combination of the phosphor light and the scattered blue light.

28. The white light generation method of claim 27 wherein the phosphor light has a diffuse reflecting surface spatial distribution and the scattered blue light has a diffuse reflecting surface spatial distribution.

29. The white light generation method of claim 27 further comprising:
simultaneously with the converting, scattering, and outputting, rotating a phosphor wheel comprising a disk-shaped substrate on which the luminescent layer is disposed as a phosphor ring.

30. The white light generation method of claim 29 wherein the phosphor wheel is a reflective phosphor wheel and the white light is output on a same side of the phosphor wheel as a side of the phosphor wheel at which the blue light impinges.

31. The white light generation method of claim 29 wherein the phosphor wheel is a transmission phosphor wheel and the white light is output on an opposite side of the phosphor wheel from a side of the phosphor wheel at which the blue light impinges.

32. The white light generation method of claim 27 wherein the luminescent layer is stationary respective to a light source that generates the blue light during the converting, scattering, and outputting.

* * * * *